United States Patent [19]

Rhamstine

[11] 4,153,296
[45] May 8, 1979

[54] VEHICLE SEAT BACK RECLINING MECHANISM

[75] Inventor: Chester F. Rhamstine, Mt. Clemens, Mich.

[73] Assignee: General Motors Corporation, Detroit, Mich.

[21] Appl. No.: 856,653

[22] Filed: Dec. 2, 1977

[51] Int. Cl.² ............................................. A47C 1/025
[52] U.S. Cl. ...................................... 297/367; 16/146; 74/529; 74/534
[58] Field of Search ................................ 297/366–371, 297/361, 362, 355, 328; 248/397; 108/6; 74/534, 541, 529; 16/139, 143, 146

[56] References Cited

U.S. PATENT DOCUMENTS

| | | | |
|---|---|---|---|
| 2,480,773 | 8/1949 | Ross | 297/375 X |
| 2,853,121 | 9/1958 | Herider et al. | 297/367 |
| 3,185,525 | 5/1965 | Welsh | 297/367 |
| 4,035,021 | 7/1977 | Krug | 297/369 |

Primary Examiner—Roy D. Frazier
Assistant Examiner—William E. Lyddane
Attorney, Agent, or Firm—Charles E. Leahy

[57] ABSTRACT

A seat back member is pivotally connected to a seat cushion member. First and second rows of successively stepped teeth are arranged in opposed rows on one of the members. First and second latch bars are pivotally mounted on the other member and one of the latch bars is engageable with the stepped teeth of one row to block forward pivoting movement of the seat back and ratchet over the teeth during rearward pivoting movement of the seat back. The other latch bar is engageable with the stepped teeth of the other row to block rearward pivoting movement of the seat back and ratchet over the teeth during forward pivoting movement of the seat back. A spring urges both latch bars to their normal positions engaging their respectively associated teeth. A release handle is operable to disengage a selected one of the latch bars from its associated teeth to permit motion of the seat back in the direction normally blocked by that latch bar. The member to which the latch bars are pivoted has a slot arcuate about the latch bar pivot and the latch bars have laterally extending latch elements extending through the arcuate slot so that the major portion of loads imposed on the seat back are transferred through the latch elements from the seat back to the seat cushion.

3 Claims, 6 Drawing Figures

VEHICLE SEAT BACK RECLINING MECHANISM

The invention relates to a seat back reclining mechanism for a vehicle seat.

It is known to provide a pivotal mount between a seat back frame member and a seat cushion frame member in a vehicle seat so that the angle of the seat back can be adjusted relative the seat frame. It is also known to provide a locking mechanism which is normally engaged to lock the seat back against adjusting movement and which is selectively disengageable to permit adjustment of the seat back angle.

Furthermore, it is known to provide a locking mechanism which includes a plurality of teeth on one of the members which are disposed in an arcuate path about the seat back reclining pivot and a pair of latch members each of which normally block relative movement of the seat back in one direction while ratching over the teeth to permit pivotal movement in the other direction. A disengaging mechanism is provided by which the occupant may disengage a selected one of the lock members in order to obtain adjustment of the seat back angle.

A disadvantage of the prior art seat back reclining mechanisms is that the general arrangement of the reclining mechanism is somewhat limited by the need to display the locking teeth in a path which is generally arcuate about the seat back reclining pivot.

According to the present invention, a seat back member is pivotally connected to a seat cushion member. First and second rows of successively stepped teeth are arranged in opposed rows on one of the members. First and second latch bars are pivotally mounted on the other member and one of the latch bars is engageable with the stepped teeth of one row to block forward pivoting movement of the seat back and ratchet over the teeth during rearward pivoting movement of the seat back. The other latch bar is engageable with the stepped teeth of the other row to block rearward pivoting movement of the seat back and ratchet over the teeth during forward pivoting movement of the seat back. A spring urges both latch bars to their normal positions engaging their respectively associated teeth. A release handle is operable to disengage a selected one of the latch bars from its associated teeth to permit motion of the seat back in the direction normally blocked by that latch bar. The member to which the latch bars are pivoted has a slot arcuate about the latch bar pivot and the latch bars have laterally extending latch elements extending through the arcuate slot so that the major portion of loads imposed on the seat back are transferred through the latch elements from the seat back to the seat cushion.

These and other objects, features and advantages of the invention will become apparent upon consideration of the appended specification and the drawings in which.

Figure 1:
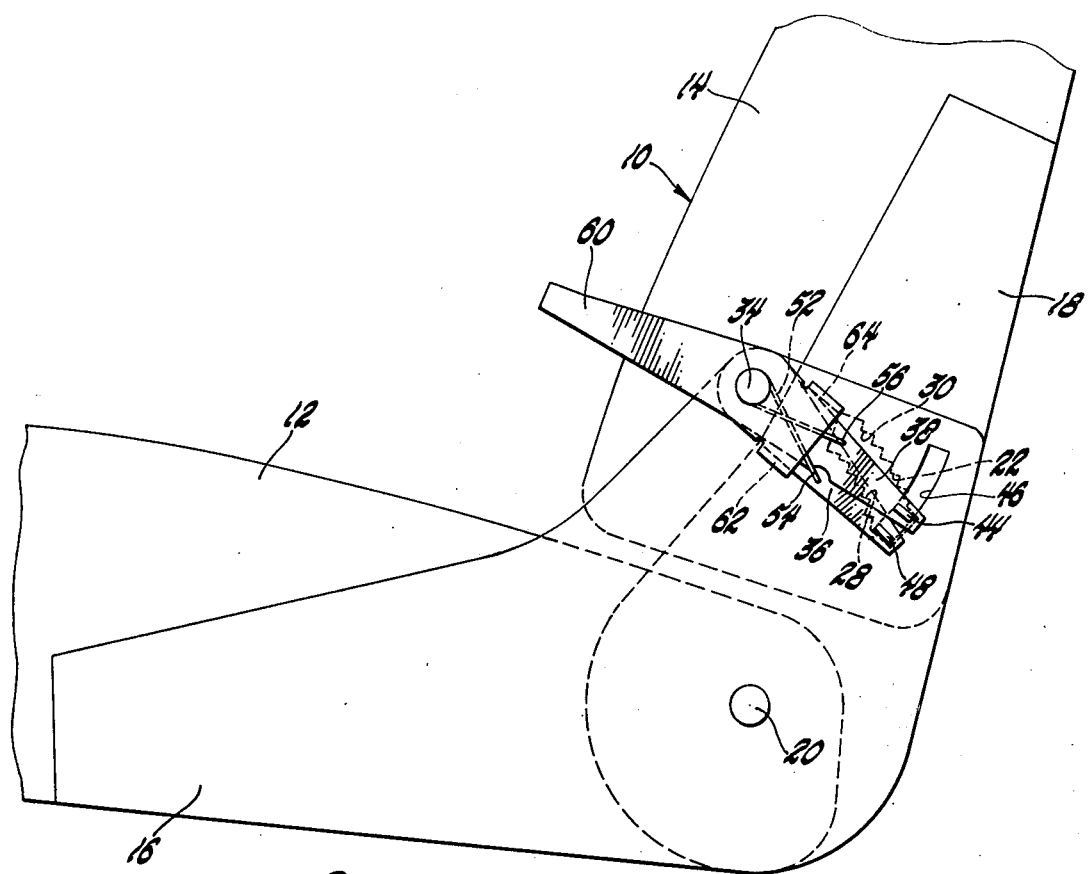
FIG. 1 is a side elevation view of a seat back reclining mechanism according to the invention and showing the reclining mechanism latched and the seat back in the full forward position.
Figure 2:
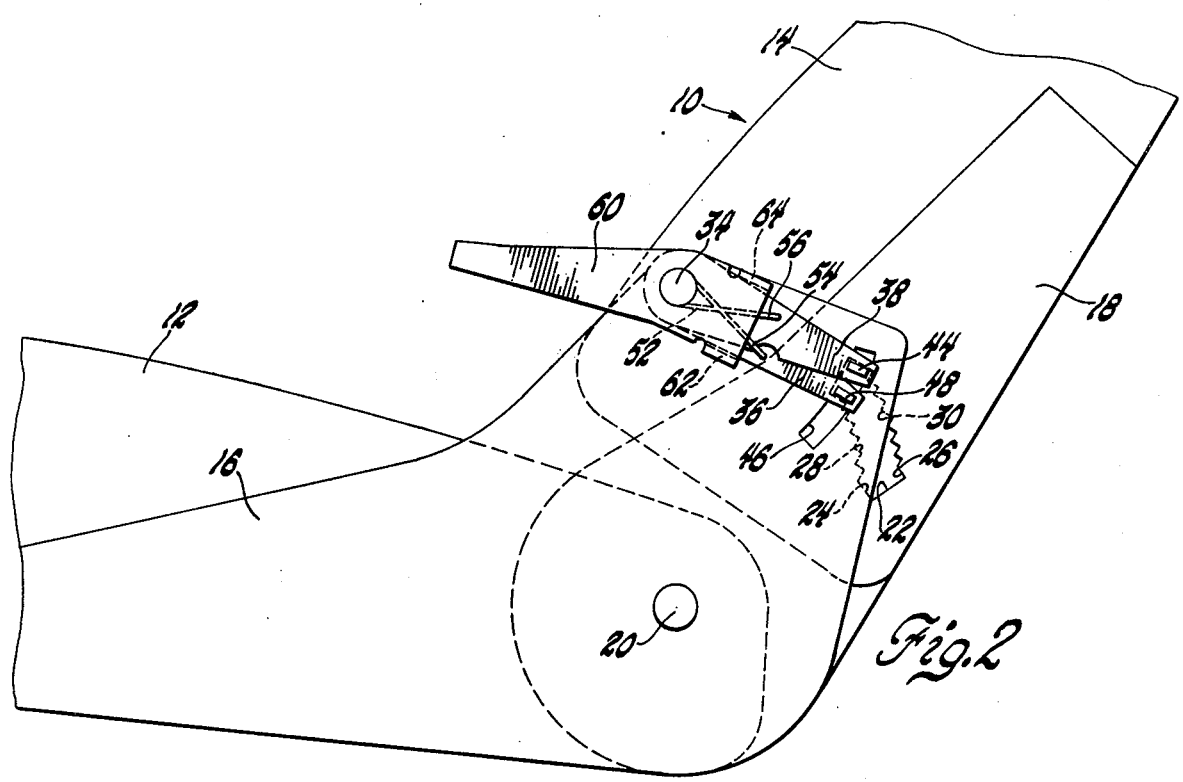
FIG. 2 is a view similar to FIG. 1 but showing the seat back in its rearwardmost position.

Referring to FIG. 1, a vehicle seat generally indicated at 10 includes a seat cushion 12 and a seat back 14. The seat cushion 12 has a frame member 16 at each side thereof. The seat back 14 has a frame member 18 at each side thereof. The seat cushion frame member 16 and the seat back frame member 18 are pivotally connected to one another by a pivot pin 20 which permits pivotal movement of the seat back 14 to adjust the angle of the seat back 14 relative the seat cushion 12. It will be understood that although the drawing shows such a pivotal connection at the outboard end of the seat, a similar pivotal connection between the cushion frame member 16 and back frame member 18 will be provided at the other end of the seat.

The seat back frame member 18 has a slot 22 therein having opposed sidewalls 24 and 26. The sidewalls 24 and 26 are respectively serrated to provide a plurality of teeth 28 and 30 thereon.

Figure 5:
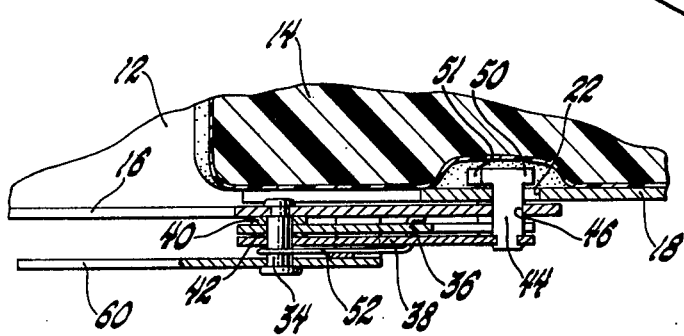
FIG. 5 is a sectional view taken in the direction of arrows 5—5 of FIG. 4.

Referring to FIG. 5, a pivot pin 34 is attached to the cushion frame member 16 and extends through apertures of first and second latch bars 36 and 38 to mount the latch bars for pivotal movement. Washers 40 and 42 may be provided respectively between the latch bar 36 and frame member 16 and the latch bar 38 and the latch bar 36. As best seen in FIG. 5, the latch bar 38 has a latch element 44 suitably attached thereto and extending laterally therefrom through a curved access slot 46 of the cushion frame member 16 into the slot 22 of the seat back frame member 18. The latch bar 36 has a like laterally extending latch element 48. The latch elements 44 and 48 have enlarged ends 50 and 51 which overlie the back frame member 18 to assure retention of the latch elements within the slot 22.

Referring to FIGS. 1 and 5, it is seen that a torsion spring 52 encircles the pivot pin 34 and has a leg 54 engaging the latch bar 36 and a leg 56 engaging the latch bar 38. The torsion spring 52 urges the latch bars 36 and 38 away from one another to urge the latch elements 44 and 48 into engagement with their respectively associated teeth 28 and 30 of slot 22. As seen in FIG. 1, the latch element 48 of the latch bar 36 engages one of the teeth 28 to prevent rearward pivoting movement of the seat back 14. Likewise, the latch element 44 of the latch bar 38 engages the end wall of slot 22 or one of the teeth 30 to prevent forward pivotal movement of the seat back 14.

Figure 6:
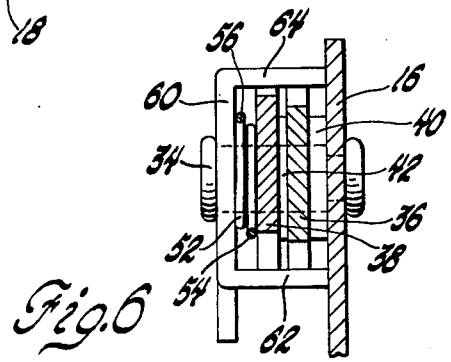
FIG. 6 is a sectional view taken in the direction of arrows 6—6 of FIG. 4.

The latch mechanism includes a release handle 60 for selective and alternate disengagement of the latch bars 36 and 38. The release handle 60, best seen in FIG. 6, has laterally extending walls 62 and 64 which are respectively engageable with the latch bars 36 and 38.

Figure 3:
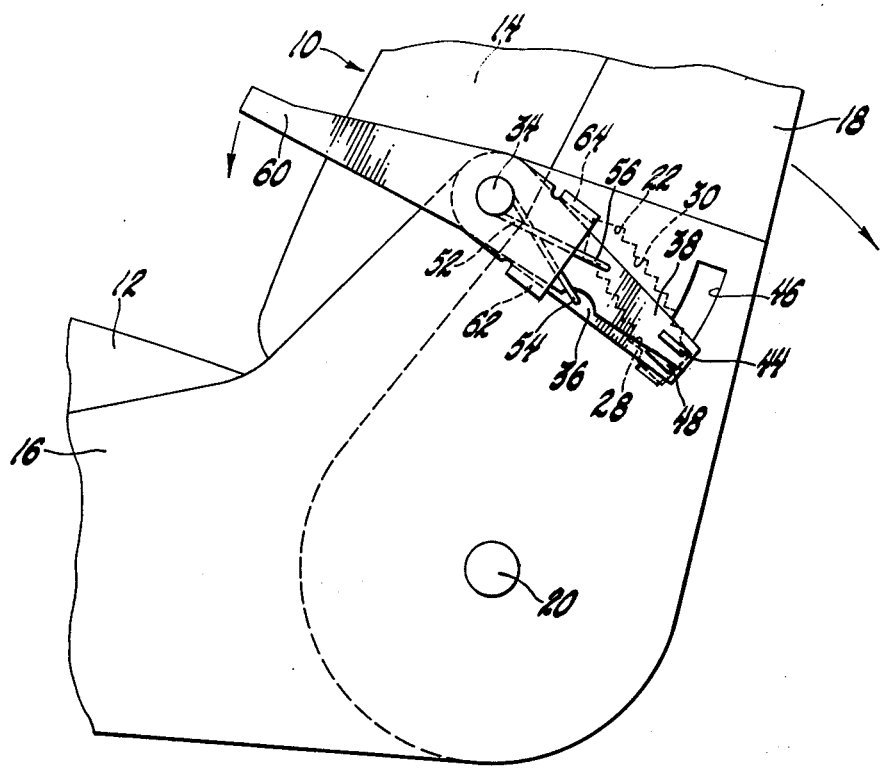
FIG. 3 is a view similar to FIG. 1 but showing the reclining mechanism unlatched for movement in the rearward reclining direction.

As seen in FIG. 3, a downward or counterclockwise pivotal movement of the release handle 60 causes the lateral wall 62 to lift the latch element 48 out of engagement with the teeth 28 to permit rearward pivoting movement of the seat back 14 while the latch element 44 of latch bar 38 ratchets over the teeth 30.

Figure 4:
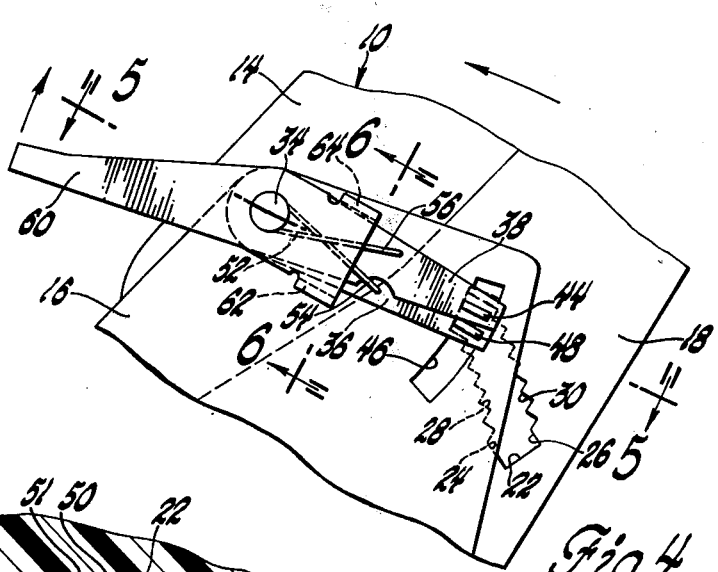
FIG. 4 is a fragmentary view similar to FIG. 2 but showing the latch mechanism disengaged to permit forward movement of the seat back.

Referring to FIG. 4, it is seen that upward or clockwise pivotal movement of the release handle 60 causes lateral wall 64 to pivot the latch bar 38 in the clockwise direction to disengage the latch element 44 from teeth 30 to permit forward pivoting movement of the seat back 14 while the latch element 48 ratchets over the teeth 28.

It will be understood that an important feature of the invention is that the walls of slot 46 are arcuate about the latch bar pivot pin 34 and are closely juxtaposed with the latch elements 44 and 48 to support the latch elements and directly transmit loads from the seat back frame member 18 to the seat cushion frame member 16 so that the pivot pin 34 and latch bars 36 and 38 need not have a strength sufficient to transfer loads therebetween. Furthermore, the reclining mechanism may be further strengthened by the provision of an additional reinforcing plate, not shown in the drawings, which would be attached to and extend parallel with the cushion frame member 16 on the opposite side of the back frame member 18. An arcuate slot would be provided in this reinforcing plate in alignment with the arcuate slot 46 of cushion frame member 16 and in close juxtaposition with the latch elements 44 and 48. Accordingly, the latch elements would be supported directly by the seat cushion frame member on both sides of the seat back frame member to effect a direct transfer of loads therebetween.

Furthermore, it will be appreciated that the invention provides a new and improved seat back reclining mechanism which is adaptable to various mounting configurations. For example, it will be noted that the location and orientation of slot 22 and the toothed sidewalls 24 and 26 thereof may be varied substantially relative the seat back pivot pin 20.

The embodiments of the invention in which an exclusive property or privilege is claimed are defined as follows:

1. In a vehicle seat having a cushion member, a back member, and a pivot means pivotally connecting the back member to the cushion member to permit forward and rearward pivoting movement of the back member relative the cushion member, the combination comprising:
 first and second rows of successively stepped teeth arranged in opposed rows on one of the members, each of said rows of teeth being non-concentric with respect to the pivot means connecting the cushion member and the back member;
 first and second latch means associated with the other member, the first latch means being engageable with the stepped teeth of one row to block forward pivoting movement of the back member and ratchet over the teeth during rearward pivoting movement, the second latch means being engageable with the stepped teeth of the other row to block rearward pivoting movement of the back member and ratchet over the teeth during forward pivoting movement;
 and release means operable to selectively disengage one of the latch means to permit motion of the back member in the direction normally blocked by that latch means.

2. In a vehicle seat having a cushion member, a back member, and a seat back pivot means pivotally connecting the back member to the cushion member to permit adjustment of the angle of the back member relative the cushion member, the combination comprising:
 a slot provided in one of the frame members, said slot being non-concentric with respect to the seat back pivot means and having opposed walls with serrations therein to display a plurality of teeth;
 first and second latch bars, the first latch bar being engageable with the teeth on one wall of the slot to block forward pivoting movement of the seat back and ratchet over the teeth during rearward pivoting movement, the second latch bar being engageable with the teeth on the other wall of the slot to block rearward pivoting movement and ratchet over the teeth during forward pivoting movement;
 a pivot means mounting the first and second latch bars on the other of the frame members,
 spring means urging the latch bars to normal positions engaging their respectively associated teeth on the walls of the slot;
 and release means operable to disengage a selected one of the latch bars from its associated teeth to permit motion of the seat back frame in the direction normally blocked by that latch bar.

3. In a vehicle seat having a cushion member, a back member, and a seat back pivot means pivotally connecting the back member to the cushion member to permit forward and rearward movement of the back member relative the cushion member, the combination comprising:
 a slot provided in one of the members, said slot having opposed sidewalls with serrations therein to provide a plurality of teeth;
 pivot means provided on the other frame member;
 a curvilinear slot provided in the other frame member and being concentric about the pivot means;
 first and second latch bars pivotally mounted on the pivot means, said latch bars having laterally extending latch portions extending through the slot in the other member so that the walls of the slot limit deflection of the latch portions by loads imposed thereon;
 one of the latch bars being engageable with the teeth on one wall of the slot to block forward pivoting movement of the seat back and ratchet over the teeth during rearward pivoting movement, the other lock bar being engageable with the teeth on the other wall of the slot to block rearward pivoting movement and ratchet over the teeth during forward pivoting movement;
 spring means urging the latch bars to normal position engaging their respectively associated teeth on the walls of the slot;
 and release means operable to disengage a selected one of the latch bars from its associated teeth to permit motion of the seat back frame in the direction normally blocked by that latch bar.

* * * * *